(12) United States Patent  
Kikuchi et al.

(10) Patent No.: US 9,408,045 B2  
(45) Date of Patent: Aug. 2, 2016

(54) AIRCRAFT COMMUNICATION CONTROL APPARATUS, AIRCRAFT, COMPUTER-READABLE RECORDING MEDIUM IN WHICH AIRCRAFT COMMUNICATION PROGRAM IS STORED AND AIRCRAFT COMMUNICATION METHOD

(71) Applicant: MITSUBISHI HEAVY INDUSTRIES, LTD., Tokyo (JP)

(72) Inventors: Shota Kikuchi, Tokyo (JP); Ippei Miyanishi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 83 days.

(21) Appl. No.: 14/042,937

(22) Filed: Oct. 1, 2013

(65) Prior Publication Data

US 2014/0099986 A1    Apr. 10, 2014

(30) Foreign Application Priority Data

Oct. 5, 2012  (JP) ................................ 2012-223488

(51) Int. Cl.  
*H04W 4/08* (2009.01)  
*H04B 7/185* (2006.01)

(52) U.S. Cl.  
CPC ............ *H04W 4/08* (2013.01); *H04B 7/18506* (2013.01)

(58) Field of Classification Search  
CPC ........................ H04B 7/18504; H04B 7/18506  
See application file for complete search history.

(56) References Cited

U.S. PATENT DOCUMENTS

| | | | |
|---|---|---|---|
| 5,530,909 A | 6/1996 | Simon et al. | |
| 7,085,562 B1 | 8/2006 | Holder et al. | |
| 8,340,067 B2* | 12/2012 | Buga | H04B 7/18506 370/338 |
| 8,548,720 B2* | 10/2013 | Shukla | G08G 5/065 188/382 |
| 8,897,770 B1* | 11/2014 | Frolov | H04W 84/06 244/25 |
| 9,083,425 B1* | 7/2015 | Frolov | H04B 7/18504 |
| 9,100,086 B1* | 8/2015 | Olsen | H04B 7/18504 |
| 2009/0103473 A1 | 4/2009 | Foster et al. | |
| 2009/0267822 A1* | 10/2009 | Shinoda | G01S 7/352 342/70 |
| 2010/0087190 A1 | 4/2010 | Pandit et al. | |

FOREIGN PATENT DOCUMENTS

| | | |
|---|---|---|
| EP | 0 618 704 | 10/1994 |
| EP | 2 051 406 | 4/2009 |
| JP | 3736112 | 1/2006 |

OTHER PUBLICATIONS

Extended European Search Report issued Feb. 4, 2015 in corresponding European patent application No. 13 18 7112.

* cited by examiner

*Primary Examiner* — Bobbak Safaipour  
(74) *Attorney, Agent, or Firm* — Wenderoth, Lind & Ponack, L.L.P.

(57) ABSTRACT

When information sharing is performed among multiple aircrafts, the number of times of communication for the information sharing is reduced. An onboard terminal (30) is a communication control apparatus (20) of an aircraft (10) which performs transmission and reception of information with a consort aircraft. When performing information sharing between two or more consort aircrafts, the onboard terminal (30) performs transmission and reception of information with a predetermined consort aircraft and thereafter performs transmission and reception of information including information transmitted from the predetermined consort aircraft, with another consort aircraft. The onboard terminal (30) performs information sharing with the consort aircrafts in accordance with a routing table showing order of aircrafts (10) to perform transmission and reception of information.

8 Claims, 8 Drawing Sheets

|  | $t_1$ | $t_2$ | $t_3$ | $t_4$ |
|---|---|---|---|---|
| #01 | #02 | #04 | #05 | SPARE |
| #02 | #01 | #03 | #06 | SPARE |
| #03 | #04 | #02 | #08 | SPARE |
| #04 | #03 | #01 | #07 | SPARE |
| #05 | #06 | #08 | #01 | SPARE |
| #06 | #05 | #07 | #02 | SPARE |
| #07 | #08 | #06 | #04 | SPARE |
| #08 | #07 | #05 | #03 | SPARE |

ONE CYCLE

TRANSMITTING AIRFRAME

AIRCRAFT COMMUNICATION CONTROL APPARATUS, AIRCRAFT, COMPUTER-READABLE RECORDING MEDIUM IN WHICH AIRCRAFT COMMUNICATION PROGRAM IS STORED AND AIRCRAFT COMMUNICATION METHOD

CROSS-REFERENCE TO RELATED APPLICATIONS

This application is based on Japanese Patent Application No. 2012-223488, the contents of which are incorporated herein by reference.

BACKGROUND OF THE INVENTION

1. Technical Field

The present invention relates to an aircraft communication control apparatus, an aircraft, a computer-readable recording medium in which an aircraft communication program is stored and an aircraft communication method.

2. Description of the Related Art

An aircraft capable of shooting and searching/tracking of a target may shoot a target while searching/tracking the target.

An example of such an aircraft is described in Japanese Patent No. 3736112 which uses in an integral manner an active target search/track apparatus and a passive target search/track apparatus capable of searching/tracking of a target without emitting electromagnetic waves to search/track a target and shoot the target.

SUMMARY OF THE INVENTION

1. Technical Problem

Figure 10:
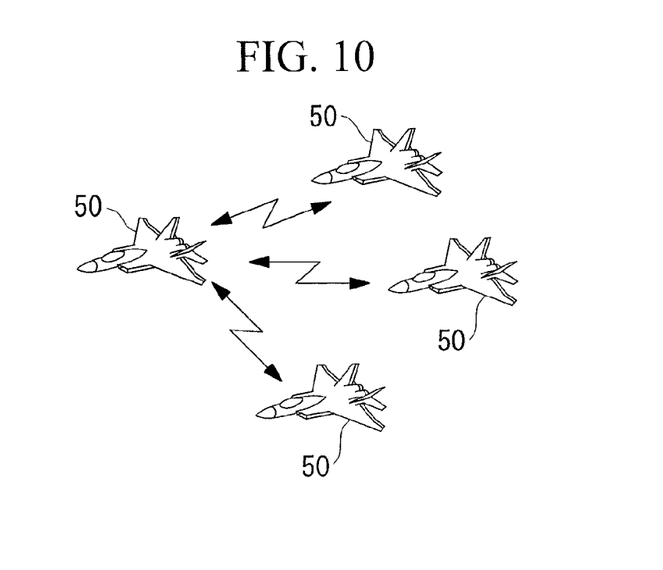
FIG. 10 is a schematic diagram showing the flow of a conventional routing communication process.

For example, in order that an aircraft as in Japanese Patent No. 3736112 shares search/track information about a target with another aircraft participating in a formation while maximizing confidentiality between the communicating aircrafts concerned, the aircraft communicates with the consort aircraft one to one as shown in the schematic diagram of FIG. 10. For example, in the case where one-to-one communication in the formation is limited to one pair and without transmission and reception performed at the same time in a formation of four aircrafts to perform information sharing, three communication steps are required to transmit information from an aircraft to the other three consort aircrafts first. Then, one-to-one information transmission is performed for each of aircrafts 50 participating in the formation. Therefore, a total of twelve communication steps are required to perform information sharing among all the aircrafts 50. Thus, in order to share information among all the aircrafts 50, n(n−1) communication steps are required when the number of the aircrafts 50 participating in the formation is denoted by n. The number of communication steps increases as the number of the aircrafts 50 increases.

The present invention has been made in view of the above situation, and an object thereof is to provide an aircraft communication control apparatus, an aircraft, a computer-readable recording medium in which an aircraft communication program is stored and an aircraft communication method capable of reducing the number of times of communication for information sharing when information sharing is performed among multiple aircrafts.

2. Solution to the Problem

In order to solve the above problem, the aircraft communication control apparatus, aircraft, computer-readable recording medium in which aircraft communication program is stored and aircraft communication method of the present invention adopt the following solutions.

An aircraft communication control apparatus according to a first aspect of the present invention is an aircraft communication control apparatus performing transmission and reception of information with a consort aircraft, wherein, in a case of performing information sharing with two or more consort aircrafts, the aircraft communication control apparatus performs transmission and reception of information with a predetermined consort aircraft and thereafter performs transmission and reception of information including information transmitted from the predetermined consort aircraft, with another consort aircraft.

The aircraft communication control apparatus according to this configuration is such a communication control apparatus for an aircraft performs transmission and reception of information with two or more consort aircrafts. Having two or more consort aircrafts refers to the case where the number of aircrafts participating in a formation is three or more.

When the aircraft performs transmission and reception of information with a consort aircraft one-to-one in order to share the information keeping confidentiality between those concerned, the number of times of communication increases as the number of aircrafts to perform information sharing increases.

Therefore, according to this configuration, in the case of performing information sharing with two or more consort aircrafts, the aircraft performs transmission and reception of information with a predetermined consort aircraft and thereafter performs transmission and reception of information including information transmitted from the predetermined consort aircraft, with another consort aircraft. Thus, the other consort aircraft can obtain the information about the predetermined consort aircraft without performing transmission and reception of the information with the predetermined consort aircraft.

Thus, in the case of performing information sharing among multiple aircrafts, this configuration can reduce the number of times of communication for the information sharing.

In the above first aspect, it is preferable to, when the number of the aircrafts is an even number, divide the aircrafts into two groups and perform information sharing between the groups after performing information sharing in each of the groups.

According to this configuration, by performing information sharing between the groups after information sharing in each group is completed, the information sharing between the groups is completed by one communication step, and therefore the number of times of communication with consort aircrafts can further be reduced.

In the above first aspect, it is preferable to, when the number of the aircrafts is an odd number, divide the aircrafts into a first group that does not include a surplus aircraft and a second group that includes the surplus aircraft and perform information sharing between the first and second groups after information sharing in the first group is completed.

According to this configuration, it is possible to, even when the number of aircrafts performing transmission and reception of information with consort aircrafts is an odd number, reduce the number of times of communication with the consort aircrafts more.

In the above first aspect, it is preferable to, at the same time as information sharing is performed between the consort aircrafts; perform information sharing between the aircraft itself and another consort aircraft.

According to this configuration, since multiple one-to-one communications are performed at the same time in a formation, the number of times of communication in the formation can further be reduced.

In the above first aspect, it is preferable to perform information sharing with the consort aircrafts in accordance with table information showing order of the aircrafts to perform transmission and reception of information.

According to this configuration, since transmission and reception of information with the consort aircrafts is performed in accordance with the table information, it is possible to simply and reliably perform information sharing with the consort aircrafts.

In the above first aspect, it is preferable that the table information is generated by each of the aircrafts.

According to this configuration, since the table information is generated by each of the aircrafts among which information sharing is performed, it is possible to efficiently perform information sharing with the consort aircrafts.

An aircraft according to a second aspect of the present invention is provided with the communication control apparatus described above.

A computer-readable recording medium according to a third aspect of the present invention is a computer-readable recording medium in which an aircraft communication control program for performing transmission and reception of information with a consort aircraft is stored, the program being for causing a computer to execute function of, in the case of performing information sharing with two or more consort aircrafts, performing transmission and reception of information with a predetermined consort aircraft and thereafter performing transmission and reception of information including information transmitted from the predetermined consort aircraft, with another consort aircraft.

An aircraft communication method according to a fourth aspect of the present invention is an aircraft communication method for performing transmission and reception of information with a consort aircraft, wherein, in the case of performing information sharing with two or more consort aircrafts, transmission and reception of information is performed with a predetermined consort aircraft and thereafter transmission and reception of information including information transmitted from the predetermined consort aircraft is performed with another consort aircraft.

3. Advantageous Effects of the Invention

According to the present invention, an excellent advantageous effect is obtained that, in the case of performing information sharing among multiple aircrafts, the number of times of communication for the information sharing can be reduced.

DETAILED DESCRIPTION OF THE INVENTION

An embodiment of an aircraft communication control apparatus, aircraft, aircraft communication program and aircraft communication method according to the present invention will be described below with reference to the drawings.

Figure 1:
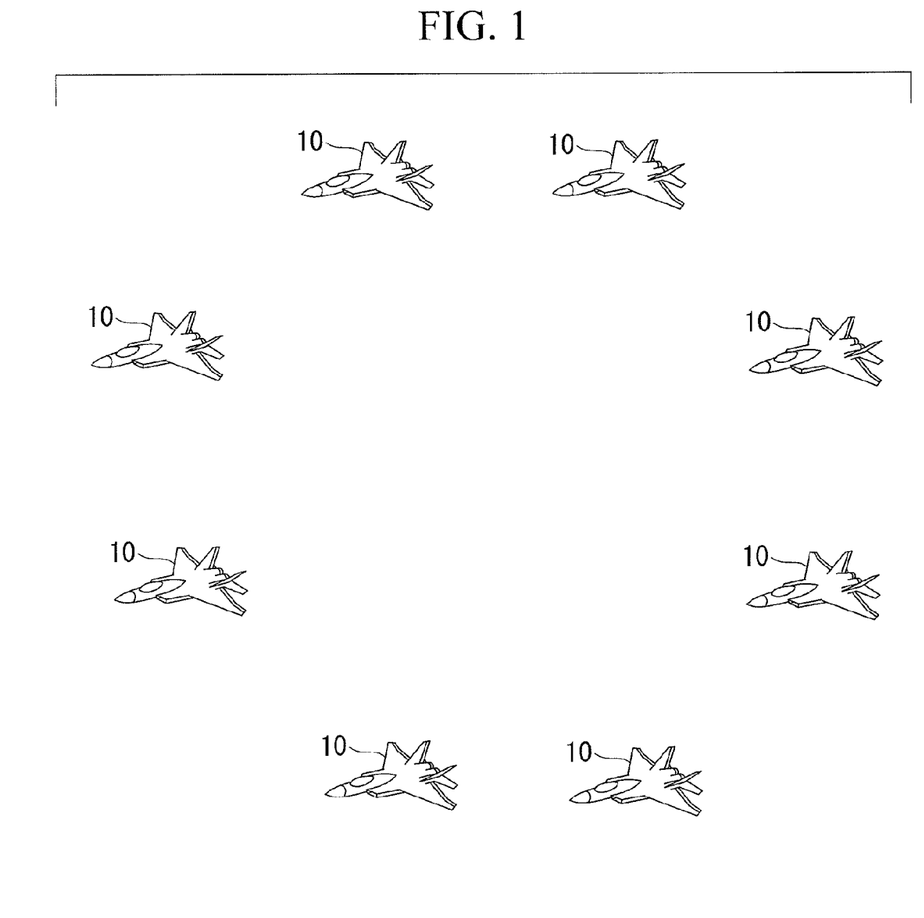
FIG. 1 is a schematic diagram showing a formation according to an embodiment of the present invention.

FIG. 1 is a diagram showing a formation according to the present embodiment. As an example, eight aircrafts 10 participate in the formation according to the present embodiment. The number of aircrafts 10 to participate in the formation is three or more. That is, one aircraft may be required to have two or more consort aircrafts.

Figure 2:
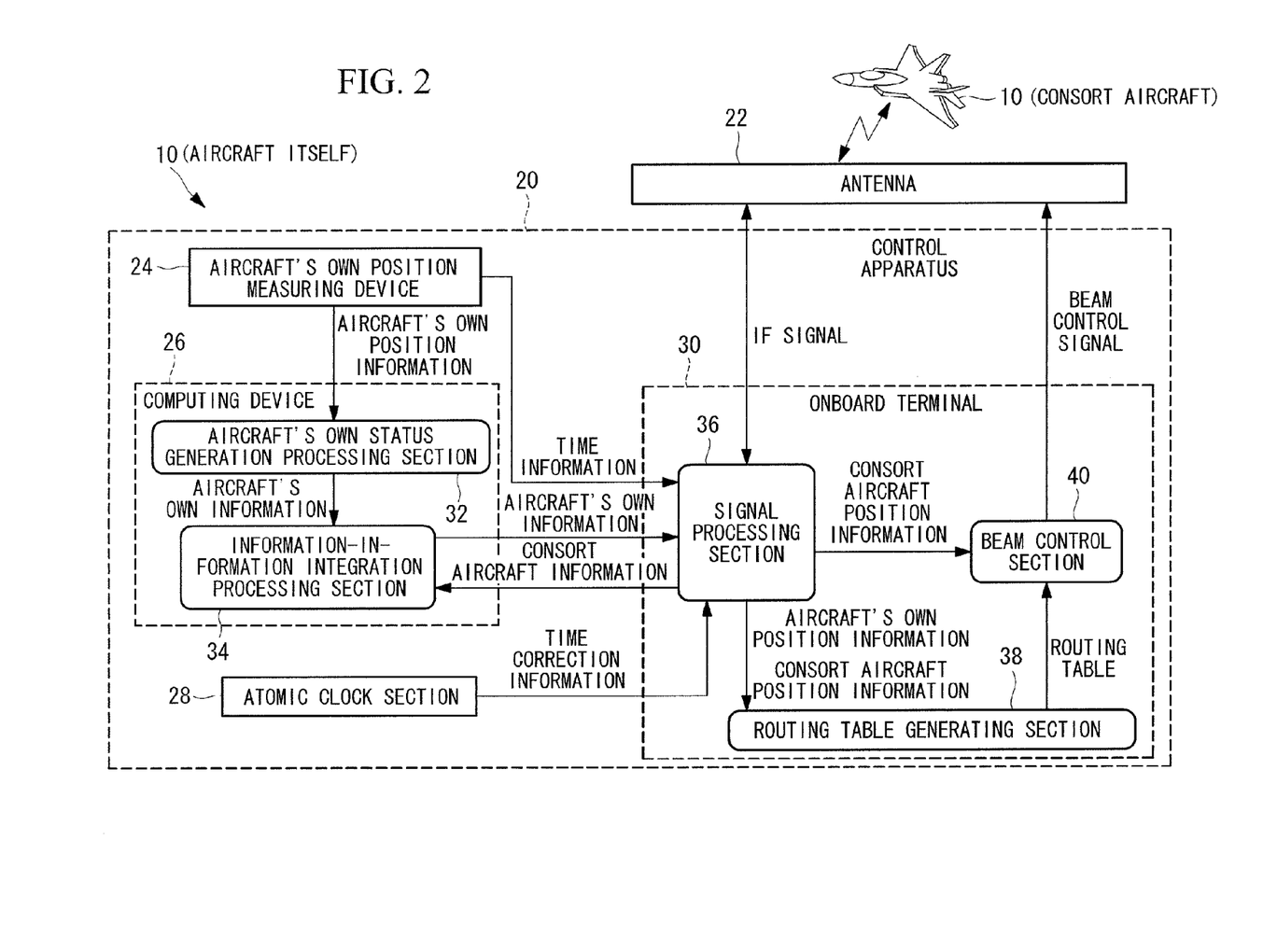
FIG. 2 is a block diagram showing the configuration of a control apparatus according to the embodiment of the present invention.

FIG. 2 is a functional block diagram showing the configuration of a control apparatus 20 provided for each aircraft 10 to control the aircraft 10, and especially shows functions related to information sharing with consort aircrafts.

Information sharing refers to sharing of various information possessed by each aircraft 10 among the aircrafts 10 participating in the formation and, more specifically, refers to sharing of various information about consort aircrafts (hereinafter referred to as "consort aircraft information") and various information about each aircraft 10 itself (hereinafter referred to as "aircraft's own information") among the aircrafts 10 participating in the formation via an antenna 22 provided for each aircraft 10. The consort aircraft information includes consort aircraft position information showing the position of a consort aircraft, information showing the state of the consort aircraft (hereinafter referred to as "airframe information") and the like. The aircraft's own information includes aircraft's own position information showing the position of the aircraft 10 itself, airframe information showing the state of the aircraft 10 itself and the like.

The control apparatus 20 is provided with an aircraft's own position measuring device 24, a computing device 26, an atomic clock section 28 and an onboard terminal 30. Each of the computing device 26 and the onboard terminal 30 is configured, for example, by a CPU (central processing unit), a RAM (random access memory), a computer-readable recording medium and the like. A series of processes for realizing various functions to be described later is recorded in a recording medium or the like, for example, in a form of a program. By the CPU reading this program to the RAM or the like and executing processing/operation of information, the various functions are realized.

The antenna 22 outputs information received from a consort aircraft to the onboard terminal 30 as an IF (intermediate frequency) signal and transmits the information shown by the IF signal outputted from the onboard terminal 30 to the consort aircraft. The antenna 22 according to the present embodiment is assumed to be an antenna capable of performing transmission and reception of information with a consort aircraft at the same time, that is, an antenna capable of full-duplex communication.

The aircraft's own position measuring device 24 is, for example, a GPS (global positioning system) or an INS (inertial navigation system), and it obtains aircraft's own position information. The aircraft's own position information is associated with time information showing time when the aircraft's own position information is obtained.

The computing device 26 is provided with an aircraft's own status generation processing section 32 and an information-in-formation integration processing section 34 and performs various operations required for flight of the aircraft 10 itself.

The aircraft's own status generation processing section 32 generates aircraft's own information by combining aircraft's own position information outputted from the aircraft's own position measuring device 24 and airframe information about the aircraft itself and outputs the aircraft's own information to the information-in-formation integration processing section 34.

The information-in-formation integration processing section 34 performs various information processings such as operation for determining a positional relationship between the aircraft itself and a consort aircraft on the basis of aircraft's own information inputted from the aircraft's own status generation processing section 32 and consort aircraft information inputted from the onboard terminal 30 to be described later.

The atomic clock section 28 outputs information for correcting time used for various operations performed in the aircraft 10 itself (hereinafter referred to as "time correction information") to synchronize time between the aircraft 10 itself and a consort aircraft.

The onboard terminal 30 is a communication control apparatus provided with a signal processing section 36, a routing table generating section 38 and a beam control section 40. In the case of performing information sharing with the consort aircrafts, the onboard terminal 30 executes a routing communication process for, after performing transmission and reception of information with a predetermined consort aircraft, performing transmission and reception of information including information transmitted from the predetermined consort aircraft, with another consort aircraft.

The signal processing section 36 performs signal processing for various information (aircraft's own information and consort aircraft information) communicated to/from a consort aircraft via the antenna 22.

The routing table generating section 38 performs a routing table generation process for generating table information showing order of the aircrafts 10 to perform transmission and reception of consort aircraft information (hereinafter referred to as a "routing table") on the basis of inputted consort aircraft position information and aircraft's own position information.

The beam control section 40 controls beams so that the antenna 22 communicates with a consort aircraft, on the basis of inputted consort aircraft position information. Especially, in the case of performing information sharing, the beam control section 40 controls beams so that communication is performed with the consort aircrafts on the basis of order shown in the routing table generated by the routing table generating section 38.

Next, the contents of various processes performed in the onboard terminal 30 will be described in detail. The aircraft 10 performs one-to-one communication with the consort aircrafts.

The antenna 22 receives consort aircraft information from a consort aircraft and transmits the consort aircraft information to the signal processing section 36 as an IF (intermediate frequency) signal.

The signal processing section 36 performs IF signal processing and modulation/demodulation processing for the IF signal inputted from the antenna 22 to cause the IF signal to be a digital signal. Since the digital signal is encrypted, the signal processing section 36 encodes the digital signal and returns the signal to the consort aircraft information. Then, the signal processing section 36 outputs the consort aircraft information to the information-in-formation integration processing section 34 provided for the computing device 26, and outputs consort aircraft position information included in the consort aircraft information to the routing table generating section 38.

When aircraft's own information is inputted from the information-in-formation integration processing section 34, and the aircraft's own information is to be transmitted to a consort aircraft via the antenna 22, the signal processing section 36 encrypts the aircraft's own information, converts it to an IF signal and outputs it to the antenna 22, as well as outputs aircraft's own position information included in the aircraft's own information to the routing table generating section 38.

The signal processing section 36 corrects time information outputted from the aircraft's own position measuring device 24 with time correction information outputted from the atomic clock section 28.

Figure 3:
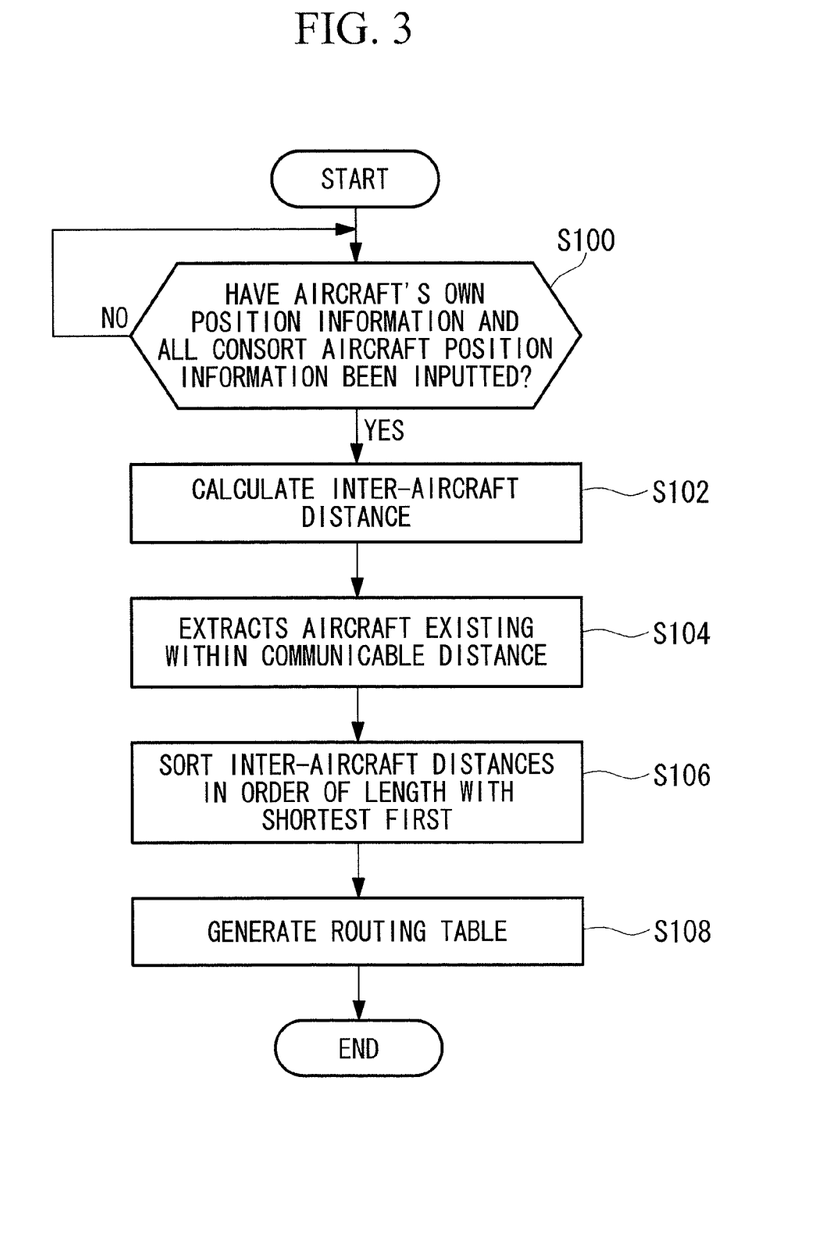
FIG. 3 is a flowchart showing the flow of a routing table generation process according to the embodiment of the present invention.

FIG. 3 is a flowchart showing the flow of the routing table generation process (routing table generation program) executed by the routing table generating section 38 in the case of generating a routing table. The routing table generation program is stored in advance in a predetermined area of a storage means (for example, a ROM) provided for the onboard terminal 30.

First, at step 100, a waiting state continues until aircraft's own position information and consort aircraft position information about all the consort aircrafts, that is, position information about all the aircrafts 10 participating in the formation are inputted. When the aircraft's own position information and all of the consort aircraft position information is inputted, the flow proceeds to step 102.

At the next step 102, distances among the aircrafts 10 (hereinafter referred to as "inter-aircraft distance") are calculated.

Next, at step 104, such aircrafts 10 that the inter-aircraft distance calculated at step 102 is within a communicable distance are extracted.

Next, at step 106, the inter-aircraft distances are sorted in order of length with the shortest first.

Next, at step 108, a routing table is generated on the basis of the lengths of the inter-aircraft distances.

For example, at this step 108, aircrafts 10 having the shortest inter-aircraft distance from each other are combined as a pair of aircrafts 10 to perform communication with each other in a time zone $t_1$, and aircrafts 10 having the second shortest inter-aircraft distance from each other are combined as a pair of aircrafts 10 to perform communication with each other in a time zone $t_2$, which is the pair different from the pair in the time zone $t_1$. Similarly, pairs for a time zone $t_3$ and subsequent time zones are determined to generate a routing table. As described above, in the routing table generation process according to the present embodiment, a routing table is generated so that the number of communication steps for enabling information sharing among all the aircrafts 10 is minimized (four times or fewer in the present embodiment).

Figure 4:
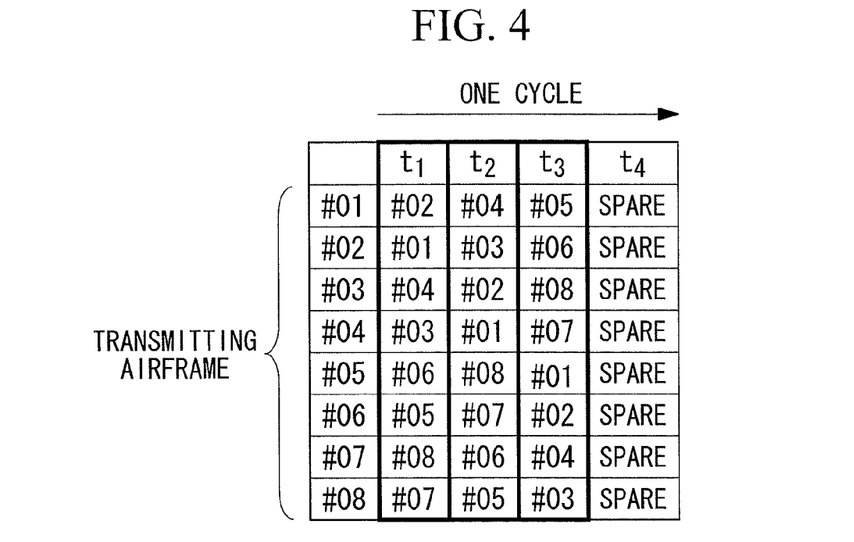
FIG. 4 is a schematic diagram showing the routing table according to the embodiment of the present invention.

FIG. 4 is a schematic diagram showing an example of the routing table generated by the routing table generating section 38. As shown in FIG. 4, in the routing table, one cycle is divided into multiple time zones, and aircrafts 10 to perform communication for information sharing are shown in each time zone. That is, aircrafts 10 of the aircraft numbers shown in the left column (#01 to #08) are transmitting airframes that transmit information, and they transmit information to aircrafts 10 of the aircraft numbers shown in a column for each time zone. A time zone $t_4$ is a spare time zone, and the usage of the time zone $t_4$ differs depending on whether the number of the aircrafts 10 to perform information sharing is an even or odd number.

The beginning of each time zone is a trigger for performing communication, and this trigger is time which is determined, for example, on the basis of position information by the GPS or the atomic clock.

Figure 5:
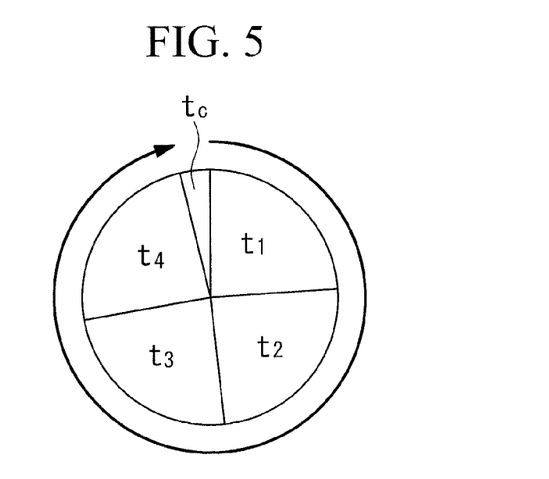
FIG. 5 is a schematic diagram showing the first one cycle of a routing communication process according to the embodiment of the present invention.

FIG. 5 is a schematic diagram showing the first one cycle of the routing communication process using the routing table.

First, in the routing communication process, a time zone $t_c$ in which the routing table generation process is to be performed is provided at the beginning. Within the time zone $t_c$, each of the multiple aircrafts 10 participating in the formation generates a routing table. That is, since each aircraft 10 generates a routing table on the basis of aircraft's own position information and consort aircraft position information obtained at the same timing, the same routing table is generated among the aircrafts 10. An instruction to start the routing table generation process is transmitted, for example, from a directive aircraft to the other aircrafts 10. If addition or leaving of an aircraft 10 to or from the formation is executed, and if the number of aircrafts participating in the formation changes, the routing communication process newly generates a routing table corresponding to the number of aircrafts participating in the formation within the time zone $t_c$.

Then, in the order of the time zones $t_1$, $t_2$, $t_3$ and $t_4$, each aircraft 10 communicates with a consort aircraft at the same timing on the basis of the routing table. In the next cycle, each aircraft 10 newly communicates with a consort aircraft in the order of the time zones $t_1$, $t_2$, $t_3$ and $t_4$. That is, each of the time zones $t_1$, $t_2$, $t_3$ and $t_4$ corresponds to a communication step. The routing table may be generated every cycle or may be generated every multiple cycles.

Figure 6:
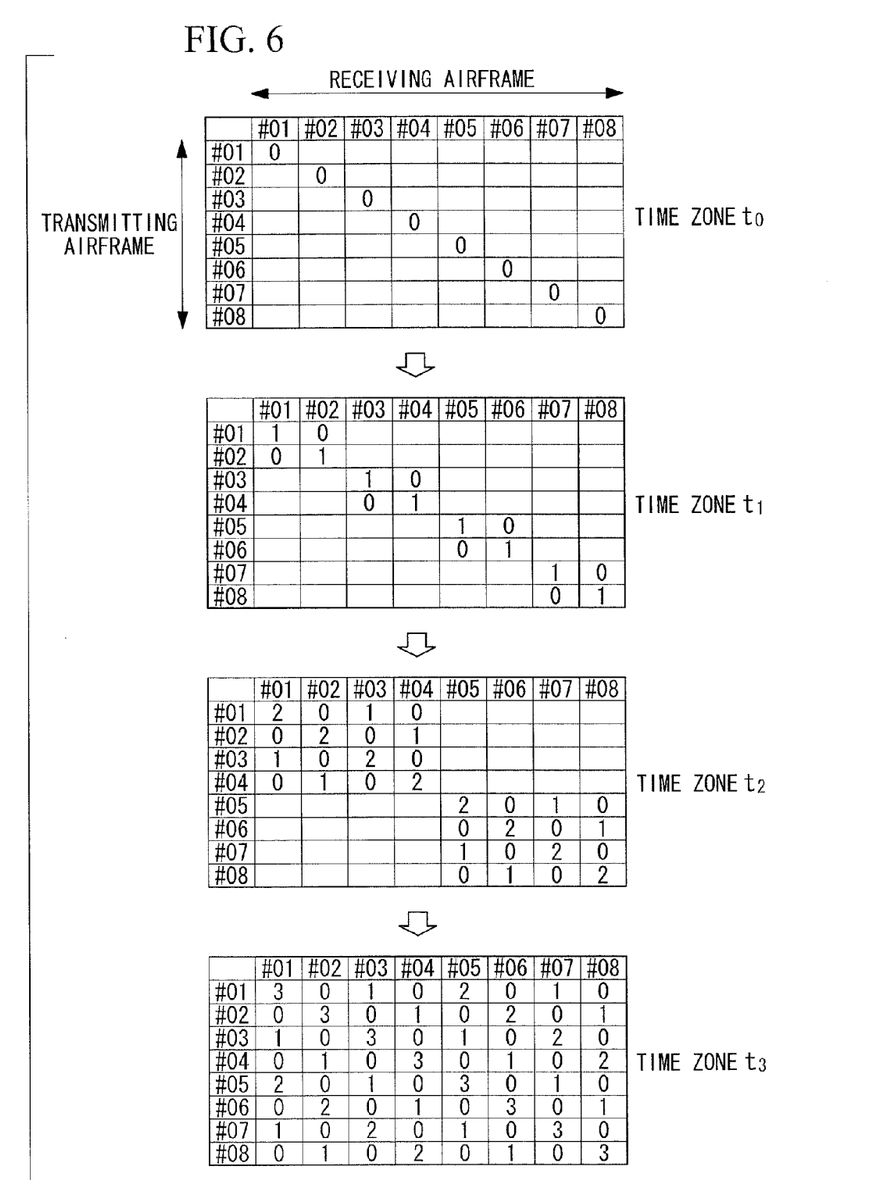
FIG. 6 is a schematic diagram showing a state of acquisition of information by each aircraft in the routing communication process when the formation is constituted by an even number of aircrafts, according to the embodiment of the present invention.

FIG. 6 is a schematic diagram showing an example of a state of acquisition of information by each aircraft 10 in the routing communication process when the formation according to the present embodiment is constituted by an even number of aircrafts. Aircrafts 10 of the aircraft numbers shown in the vertical axis in FIG. 6 are transmitting airframes, and aircrafts 10 of the aircraft numbers shown in the horizontal axis are receiving airframes which receive information. In FIG. 6, information obtained by each aircraft 10 is indicated by a numeral beginning with "0," and the magnitude of the numerals indicates the number of times of update.

Figure 7:
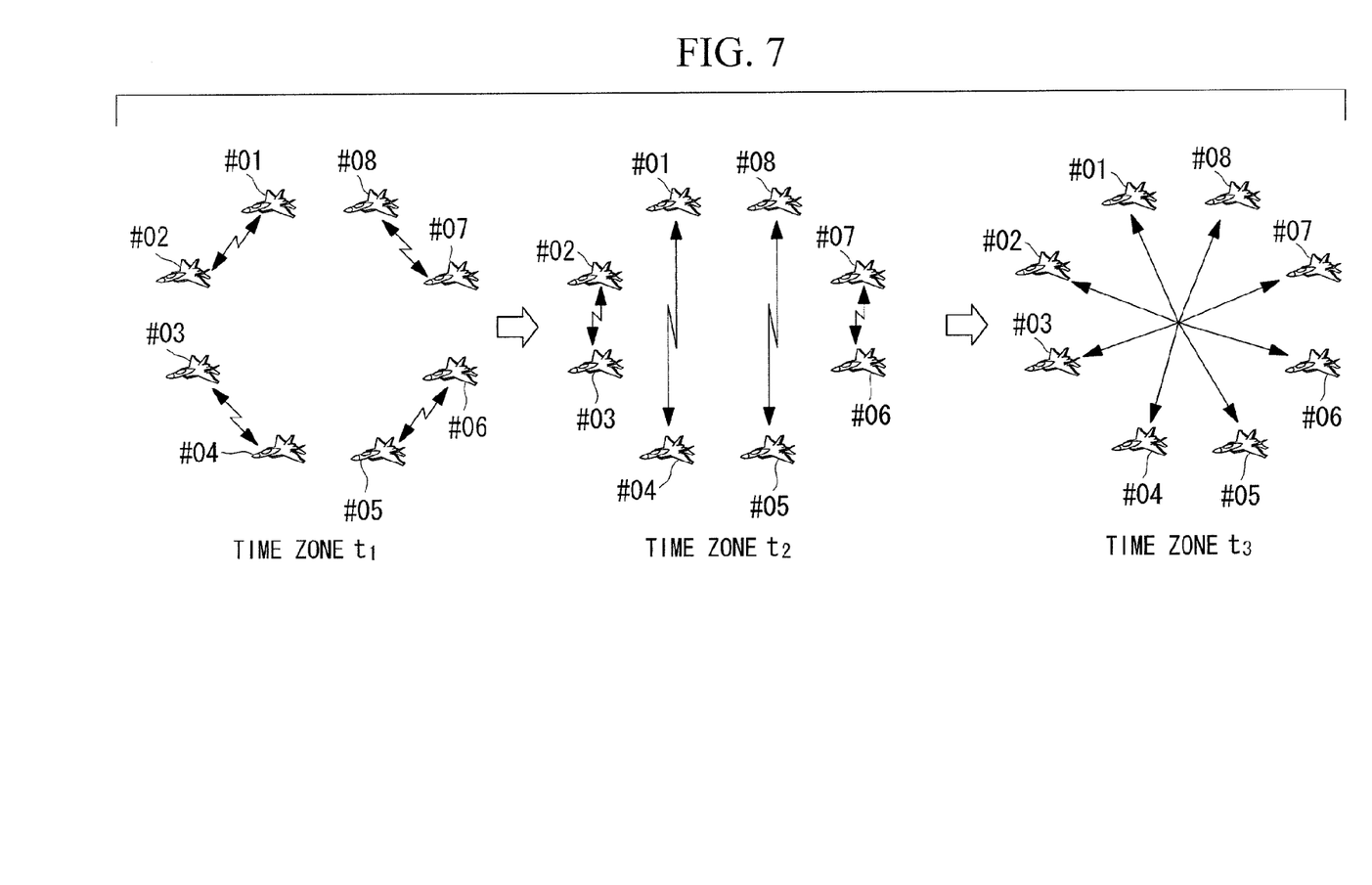
FIG. 7 is a schematic diagram showing pairs of aircrafts performing communication corresponding to FIG. 6 according to the embodiment of the present invention.

FIG. 7 is a schematic diagram showing pairs of aircrafts 10 performing communication corresponding to FIG. 6.

First, in the time zone $t_0$, aircraft's own information about each aircraft 10 is updated. In this time zone, communication between aircrafts 10 is not performed yet.

In the next time zone $t_1$, communication with a consort aircraft in accordance with a routing table is performed. In each time zone, the beam control section 40 generates a beam control signal so that, on the basis of consort aircraft position information about a consort aircraft in accordance with the routing table, the antenna 22 radiates a beam in a direction where the consort aircraft is positioned.

In the example in FIG. 6, communication is performed in order of distance between aircrafts 10 with the shortest first, that is, between a pair of the aircraft numbers #01 and #02, a pair of the aircraft numbers #03 and #04, a pair of the aircraft numbers #05 and #06 and a pair of the aircraft numbers #07 and #08. Thereby, each aircraft 10 obtains information about a total of two aircrafts, that is, consort aircraft information about a consort aircraft with which the aircraft has communicated (information indicated by "0" shown in FIG. 6) and aircraft's own information about the aircraft itself. The aircraft's own information about each aircraft 10 is updated to be "1".

In the next time zone $t_2$, communication with the next consort aircraft in accordance with the routing table is performed. In the example in FIG. 6, communication is performed between a pair of the aircraft numbers #01 and #04, a pair of the aircraft numbers #02 and #03, a pair of the aircraft numbers #05 and #08 and a pair of the aircraft numbers #06 and #07. In this time zone $t_2$, each aircraft 10 transmits and receives the consort aircraft information obtained in the time zone $t_1$ together with the updated aircraft's own information. Thereby, each aircraft 10 indirectly obtains consort aircraft information about a consort aircraft with which the aircraft 10 has not directly communicated. For example, the aircraft number #01 obtains consort aircraft information about the aircraft number #03 with which the aircraft number #01 has not directly communicated, by communication with the aircraft number #04, and the aircraft number #02 obtains consort aircraft information about the aircraft number #04 with which the aircraft number #02 has not directly communicated, by communication with the aircraft number #03. Thereby, each aircraft 10 obtains information about four consort aircrafts including the aircraft's own information. The aircraft's own information about each aircraft 10 is updated to be "2".

In the next time zone $t_3$, communication with the next consort aircraft in accordance with the routing table is performed. In the example in FIG. 6, communication is performed between a pair of the aircraft numbers #01 and #05, a pair of the aircraft numbers #02 and #06, a pair of the aircraft numbers #03 and #07 and a pair of the aircraft numbers #04 and #08. In this time zone $t_3$, each aircraft 10 transmits and receives the consort aircraft information obtained in the time zones $t_1$ and $t_2$ together with the updated aircraft's own information. Thereby, all the aircrafts 10 obtain information about all the eight aircrafts. The aircraft's own information about each aircraft 10 is updated to be "3".

Then, in the next time zone $t_4$ set as spare, communication is performed again between the aircrafts which communicated with each other in the time zone $t_1$, and, after that, information sharing with consort aircrafts is continuously performed in accordance with the routing table.

As described above, in the case of performing information sharing, each aircraft 10 performs transmission and reception of information with a predetermined consort aircraft, and then performs transmission and reception of information including the information transmitted from the predetermined consort aircraft, with another consort aircraft. When the number of aircrafts 10 participating in the formation is an even number, the aircrafts 10 are divided into two groups. After information sharing is performed in each group, information sharing is performed between the groups. In the example in FIG. 6, the aircraft numbers #01 to #04 are grouped as one group, and the aircraft numbers #05 to #08 are grouped as one group. By performing information sharing between the groups after information sharing in each group is completed as described above, the information sharing between the groups is completed by one communication step. Therefore, this can reduce the number of times of communication with consort aircrafts regarding the aircraft 10.

Next, description will be made on a case where the number of aircrafts 10 participating in a formation is an odd number.

When the number of aircrafts 10 is an odd number, the aircrafts 10 are divided into a first group that does not include a surplus aircraft 10 and a second group that includes the surplus aircraft 10. After information sharing in the first group is completed, information sharing is performed between the first and second groups.

Figure 8:
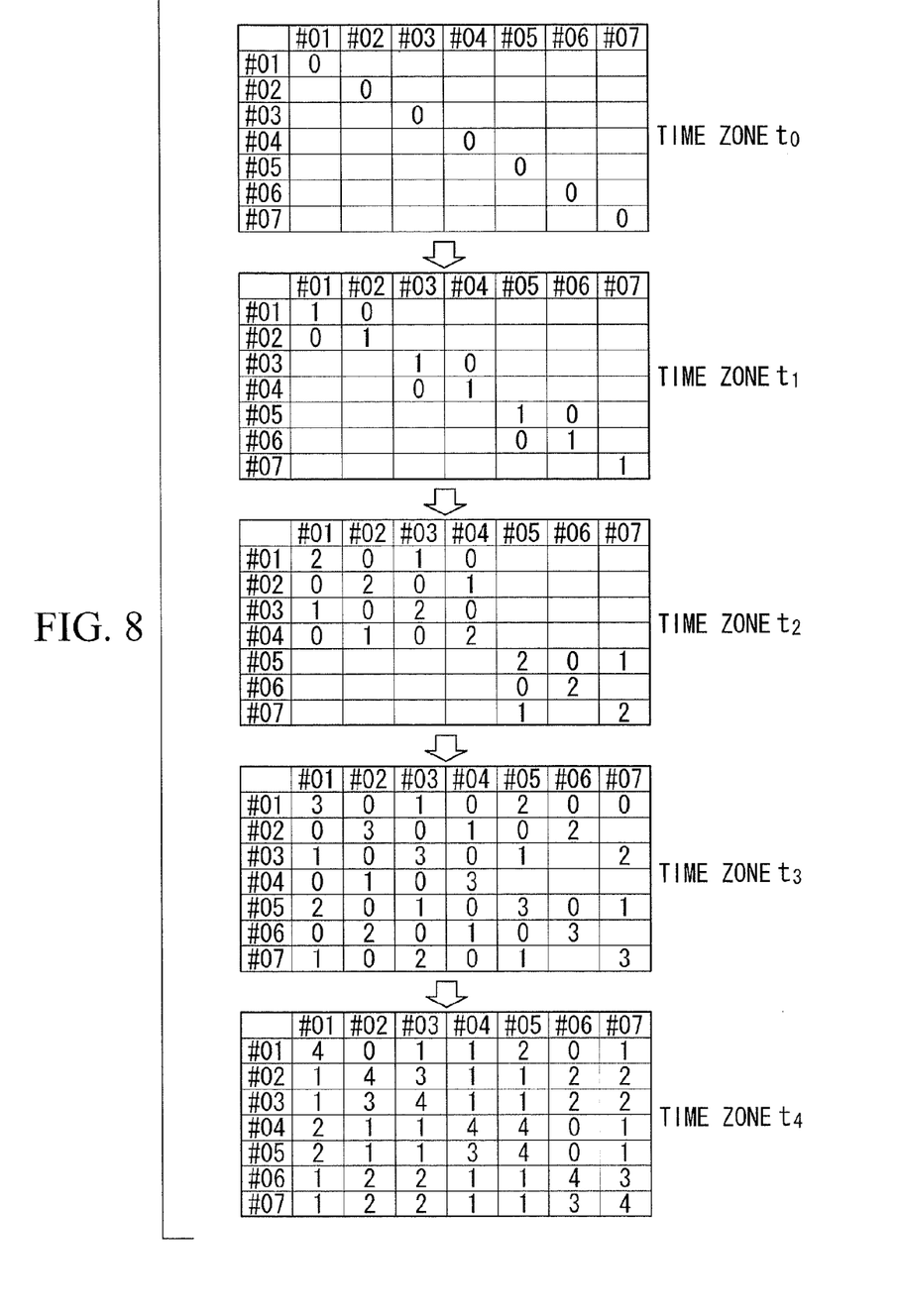
FIG. 8 is a schematic diagram showing a state of acquisition of information by each aircraft in the routing communication process when the formation is constituted by an odd number of aircrafts, according to the embodiment of the present invention.

FIG. 8 is a schematic diagram showing an example of a state of acquisition of information by each aircraft in the routing communication process when the formation is constituted by an odd number of aircrafts. In the example in FIG. 8, there are seven aircrafts 10. The aircraft numbers #01 to #04 are grouped as a first group; the aircraft numbers #05 to #07 are grouped as a second group; and, as an example, the aircraft number #07 at a distance farthest from the aircraft number #01 is regarded as a surplus aircraft.

First, in the time zone $t_0$, aircraft's own information about each aircraft 10 is updated. In this time zone, communication between aircrafts 10 is not performed yet.

In the next time zone $t_1$, communication with a consort aircraft in accordance with a routing table is performed.

In the example in FIG. 8, communication is performed between a pair of the aircraft numbers #01 and #02, a pair of the aircraft numbers #03 and #04 and a pair of the aircraft numbers #05 and #06. The aircraft number #07 does not communicate with any consort aircraft. Thereby, each of the aircrafts 10 of the aircraft number #01 to #06 obtains information about a total of two aircrafts: consort aircraft information about a consort aircraft with which the air craft has communicated (information indicated by "0" shown in FIG. 7), and aircraft's own information about the aircraft itself. The aircraft's own information about each aircraft 10 is updated to be "1".

In the next time zone $t_2$, communication with the next consort aircraft in accordance with the routing table is performed.

In the example in FIG. 8, communication is performed between a pair of the aircraft numbers #01 and #04, a pair of the aircraft numbers #02 and #03 and a pair of the aircraft numbers #05 and #07. The aircraft number #06 does not communicate with any consort aircraft. In this time zone $t_2$, each aircraft 10 transmits and receives the consort aircraft information obtained in the time zone $t_1$ together with the updated aircraft's own information. Thereby, each aircraft 10 obtains information about at least two aircrafts including the aircraft's own information. The aircraft's own information about each aircraft 10 is updated to be "2".

In the next time zone $t_3$, communication with the next consort aircraft in accordance with the routing table is performed.

In the example in FIG. 8, communication is performed between a pair of the aircraft numbers #01 and #05, a pair of the aircraft numbers #02 and #06 and a pair of the aircraft numbers #03 and #07. The aircraft number #04 does not communicate with any consort aircraft. In this time zone $t_3$, each aircraft 10 transmits and receives the consort aircraft information obtained in the time zones $t_1$ and $t_2$ together with the updated aircraft's own information. Thereby, each aircraft 10 obtains information about at least four aircrafts including the aircraft's own information. Especially, the aircraft number #01 obtains information about all the aircrafts 10. The aircraft's own information about each aircraft 10 is updated to be "3".

In the next time zone $t_4$ regarded as a spare, communication with the next consort aircraft in accordance with the routing table is performed.

In the example in FIG. 8, communication is performed between a pair of the aircraft numbers #02 and #03, a pair of the aircraft numbers #04 and #05 and a pair of the aircraft numbers #07 and #08. The aircraft number #01 which has already obtained the information about all the aircrafts 10 does not communicate with any consort aircraft. In this time zone $t_4$, each aircraft 10 transmits and receives the consort aircraft information obtained in the time zones $t_1$ and $t_2$ together with the updated aircraft's own information. Thereby, all the aircrafts 10 obtain information about all the eight aircrafts. The aircraft's own information about each aircraft 10 is updated to be "4".

In the case where aircrafts 10 participating in the formation are divided into two groups and the number of aircrafts 10 constituting each group is an odd number, such as the case where six aircrafts participate in the formation, an aircraft 10 to be a surplus is determined for each group, and the routing communication process is performed.

As seen from FIGS. 6 to 8, at the same time as information sharing is performed between consort aircrafts, information sharing between an aircraft itself and another consort aircraft is performed. That is, since multiple one-to-one communications are performed at the same time in the formation, the number of times of communication in the formation can further be reduced.

Figure 9:
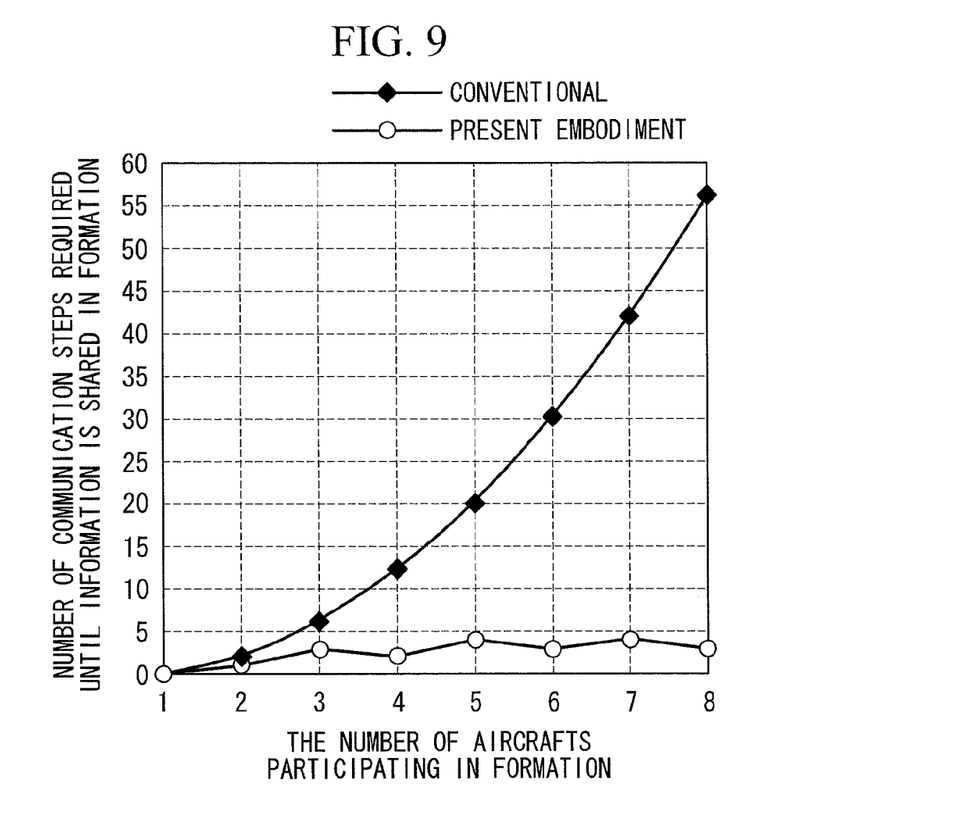
FIG. 9 is a graph showing the number of communication steps required for information sharing in the formation according to the embodiment of the present invention.

FIG. 9 is a graph showing the number of communication steps required for sharing information in the formation according to the present embodiment.

In FIG. 9, the case of the present embodiment and a conventional case are compared. In the conventional case, the number of communication steps required for information sharing increases as the number of aircrafts participating in a formation increases. On the other hand, when the routing communication process according to the present embodiment is performed, the required number of communication steps is four at the maximum irrespective of increase in the number of aircrafts, and the number of communication steps drastically decreases in comparison with the conventional case.

As described above, the onboard terminal 30 according to the present embodiment is a communication control apparatus for the aircraft 10 performing transmission and reception of information with a consort aircraft. In the case of performing information sharing with two or more consort aircrafts, the onboard terminal 30 performs transmission and reception of information with a predetermined consort aircraft and thereafter performs transmission and reception of information including information transmitted from the predetermined consort aircraft, with another consort aircraft. Therefore, in the case of sharing information among multiple aircrafts, the onboard terminal 30 can reduce the number of times of communication for information sharing.

Since performing information sharing with the consort aircrafts in accordance with a routing table showing order of aircrafts to perform transmission and reception of information, the onboard terminal 30 can simply and reliably perform information sharing with the consort aircrafts.

The present invention has been described above with the use of the above embodiment. However, the technical scope of the present invention is not limited to the scope described in the above embodiment. Various modifications or improvements can be added to the above embodiment within a range not departing from the scope of the present invention, and the modified or improved embodiments are also included in the technical scope of the present invention.

For example, though description has been made on a form of performing communication in order of distance between aircrafts 10 with the shortest first in the routing communication process in the above embodiment, the present invention is not limited thereto. A form of performing communication in order of distance between aircrafts 10 with the longest first is also possible.

Furthermore, though description has been made on a form of generating a routing table with an inter-aircraft distance as a condition, in the routing table generation process described in the above embodiment, the present invention is not limited thereto. A form of generating a routing table on the basis of another condition is also possible. Not a form of each aircraft 10 generating a routing table but a form of each aircraft 10 storing a routing table generated in advance is also possible.

Furthermore, though description has been made on a form in which the antenna 22 is an antenna capable of full-duplex communication in the above embodiment, the present invention is not limited thereto. A form in which the antenna 22 is an antenna performing half-duplex communication is also possible. In the case of this form, each aircraft 10 executes communication of receiving information from a consort aircraft after transmitting information to the consort aircraft or communication of transmitting information to a consort aircraft after receiving information from the consort aircraft, as one communication step in each time zone.

Furthermore, the flow of the routing table generation process described in the above embodiment is merely an example, and it is possible to delete an unnecessary step, add a new step or exchange positions in processing order within a range not departing from the scope of the present invention.

REFERENCE SIGNS LIST

10 aircraft
30 onboard terminal

The invention claimed is:

1. An aircraft communication control apparatus which is provided in an aircraft and which performs transmission and reception of information with each of a plurality of consort aircrafts, wherein, in a case of performing information sharing with each of the plurality of consort aircrafts, the aircraft communication control apparatus performs transmission and reception of information with a predetermined consort aircraft among the plurality of consort aircrafts and thereafter performs transmission and reception of information transmitted from the predetermined consort aircraft and information of the aircraft, with a consort aircraft among the plurality of consort aircrafts other than the predetermined consort aircraft, and
wherein, when a number of the aircrafts is an even number, the aircrafts are divided into two groups, and information sharing between the groups is performed after information sharing is performed in each of the groups.

2. The aircraft communication control apparatus according to claim 1, wherein, when the number of the aircrafts is an odd number, the aircrafts are divided into a first group that does not include a surplus aircraft and a second group that includes the surplus aircraft, and information sharing is performed between the first and second groups after information sharing in the first group is completed.

3. The aircraft communication control apparatus according to claim 1, wherein, at the same time as information sharing is performed between consort aircrafts, information sharing is performed between the aircraft itself and another consort aircraft.

4. The aircraft communication control apparatus according to claim 1, wherein the communication control apparatus performs information sharing with the consort aircrafts in accordance with table information showing order of aircrafts to perform transmission and reception of information.

5. The aircraft communication control apparatus according to claim 4, wherein the table information is generated by each of the aircrafts.

6. An aircraft comprising a communication control apparatus according to claim 1.

7. A non-transitory computer-readable recording medium in which an aircraft communication control program for performing transmission and reception of information with each of a plurality of consort aircrafts is stored, the program being for causing a computer to execute function of, in a case where an aircraft performs information sharing with each of the plurality of consort aircrafts, performing transmission and reception of information with a predetermined consort aircraft among the plurality of consort aircrafts and thereafter performing transmission and reception of information transmitted from the predetermined consort aircraft and information of the aircraft, with a consort aircraft among the plurality of consort aircrafts other than the predetermined consort aircraft, and
wherein, when a number of the aircrafts is an even number, the aircrafts are divided into two groups, and information sharing between the groups is performed after information sharing is performed in each of the groups.

8. An aircraft communication method for performing transmission and reception of information with each of a plurality of consort aircrafts, wherein, in a case where an aircraft performs information sharing with each of the plurality of consort aircrafts, transmission and reception of information is performed with a predetermined consort aircraft among the plurality of consort aircrafts and thereafter transmission and reception of information transmitted from the predetermined consort aircraft and information of the aircraft is performed with a consort aircraft among the plurality of consort aircrafts other than the predetermined consort aircraft, and
wherein, when a number of aircrafts is an even number, the aircrafts are divided into two groups, and information sharing between the groups is performed after information sharing is performed in each of the groups.

* * * * *